Figure 1:
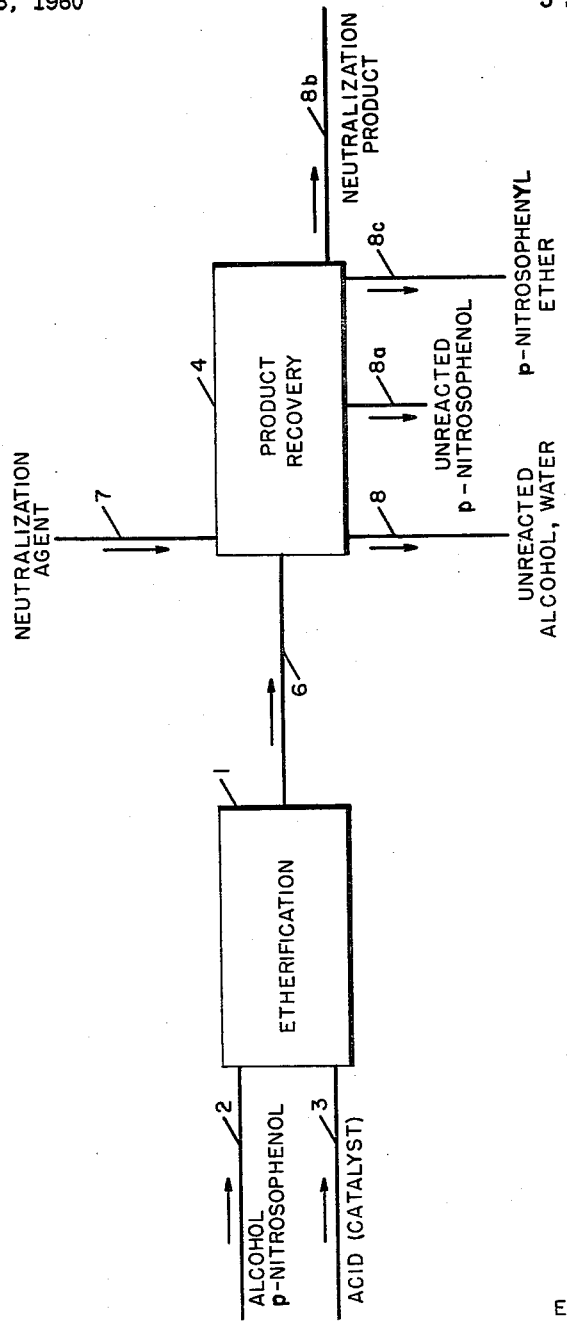

EDWARD H. DEBUTTS
JOHN T. HAYS
HERBERT L. YOUNG
INVENTORS

BY Ernest J. Peterson

AGENT

EDWARD H. DEBUTTS
JOHN T. HAYS
HERBERT L. YOUNG
INVENTORS

BY Ernest G. Peterson
AGENT

EDWARD H. DEBUTTS
JOHN T. HAYS
HERBERT L. YOUNG
INVENTORS

BY Ernest G. Peterson
AGENT

EDWARD H. DEBUTTS
JOHN T. HAYS
HERBERT L. YOUNG
INVENTORS

BY Ernest G. Peterson

AGENT 3,107,265
PREPARATION OF ETHERS OF
P-NITROSOPHENOL
Edward H. de Butts, Woodside Manor, Wilmington, John T. Hays, New Castle, and Herbert L. Young, Wilmington, Del., assignors to Hercules Powder Company, Wilmington, Del., a corporation of Delaware
Filed Mar. 28, 1960, Ser. No. 17,895
12 Claims. (Cl. 260—612)

This invention relates to the preparation of ethers of p-nitrosophenol by reaction of the phenol with an alcohol. In another aspect this invention relates to the manufacture of p-nitrosophenyl ethers which have especial utility as intermediate products in the manufacture of aromatic amines from p-nitrosophenol. In another aspect this invention relates to the manufacture of p-nitrosophenyl alkyl ethers which are now preferred intermediates in the manufacture of phenylamine derivatives from p-nitrosophenol. In another aspect this invention relates to a process utilizing a novel combination of steps for carrying out an acid-catalyzed etherification of p-nitrosophenol to form a p-nitrosophenyl ether as product. In still another aspect the invention relates to preparation of p-nitrosophenyl ethers, as chemical intermediates, from p-nitrosophenol and an alcohol, without the need for isolating the ether from the reaction mixture containing same.

We have found that when attempting to prepare aromatic amines, for example, p-nitrosodiphenylamine, by amination of p-nitrosophenol, quite insignificant yields of the amine product are obtained. We have discovered, however, that the p-nitrosophenol can first be reacted to form a corresponding p-nitrosophenyl ether in high yield and that the ether so produced can be reacted with the amine reactant alone or as a component of the reaction mixture in which it is formed, to form the said aromatic amine in high yield, the said ether product having especial utility, therefore, as a chemical intermediate in the manufacture of p-nitrosophenylamines from p-nitrosophenol; and the ether-forming reaction being of especial importance in providing an amination route from phenol to phenylamine derivatives.

p-Nitrosophenyl ethers have various additional especial utilities. They can be reduced to form the corresponding para amine derivative, viz., $NH_2C_6H_5OR$, and they can be condensed in the presence of an alkaline agent to a corresponding azoxy compound, viz., $$ROC_6H_5N(O)=NC_6H_5OR$$

followed by reduction of the azoxy compound to form the said para amine derivative, both routes to the para amine derivative being as disclosed and claimed in the copending application Serial No. 17,896 filed March 28, 1960, and they can be oxidized to the corresponding nitro compound, viz., $NO_2C_6H_5OR$. These products so produced from p-nitrosophenyl ethers are well known chemical intermediates in route to antioxidants and dye stuffs.

While the p-nitrosophenyl ethers are known, there has previously been no method for obtaining them from readily available materials by straightforward procedures. Known methods are indirect and give low overall yields. For example, the method generally used involves reduction of a p-nitrophenyl ether to the corresponding hydroxylamine which is then oxidized to the p-nitrosophenyl ether. Product recovery usually requires the cumbersome operation of steam distillation under reduced pressure. This method is not attractive for commercial deveolpment. On the other hand, when one attempts to etherify p-nitrosophenol directly with the usual etherifying reagents, mixtures of products are obtained in which the ether of the tautomeric oxime form of p-nitrosophenol is the predominant product.

This invention is concerned with a simplified process for manufacture of p-nitrosophenyl ethers which involves direct etherification of p-nitrosophenol with an alcohol under mild conditions with high ether product yield. The ether product can be isolated in any desired degree of purity, or can be utilized as a component of at least a part of the etherification reaction mixture in which it is formed.

An object of the invention is to provide for the preparation of p-nitrosophenyl ethers from p-nitrosophenol and an alcohol. Another object is to provide for the manufacture of p-nitrosophenyl alkyl ethers, which are now preferred intermediates in the manufacture of various phenylamine derivatives from p-nitrosophenol. Another object is to provide for the preparation of an ether intermediate reactant, for the manufacture of aromatic amine derivatives from p-nitrosophenol, without the need for complete isolation of the ether from the reaction mixture in which it is formed. Another object is to provide for the production of p-nitrosophenyl ethers in high per-pass conversions and high yield employing mild reaction conditions. Other objects and aspects will be apparent from the accompanying disclosure and the appended claims.

In accordance with the invention a method is provided for the preparation of p-nitrosophenyl ethers which comprises reacting p-nitrosophenol with an alcohol selected from the group consisting of primary and secondary alcohols at a temperature within the range of from about 0 to 150 C., to form the said p-nitrosophenyl ether, in the presence of an acid as a catalyst therefor. Also in accordance with the invention, an etherification process is provided, as above described, wherein following the etherification, the unreacted alcohol, reactant-solvent, which holds both the ether product and unreacted p-nitrosophenol reactant in solution, is replaced in a solvent exchange step by a solvent of sufficiently low solvent action for the p-nitrosophenol and sufficiently high solvent action for the ether to cause precipitation of the p-nitrosophenol for easy separation and recovery of p-nitrosophenol for recycle but to retain ether product in solution therewith for ether recovery in a subsequent step.

Further in accordance with the invention, an etherification process is provided, as above described, wherein the alcohol reactant is water immiscible, and following etherification, acid and unreacted p-nitrosophenol components of the resulting etherification reaction mixture are reacted with an aqueous alkaline agent under neutralization conditions to neutralize the acid and convert the unreacted p-nitrosophenol to the corresponding phenolate, the latter then being extracted into the resulting aqueous phase, followed by acidification of the said aqueous phase to convert the phenolate to p-nitrosophenol which precipitates under those conditions for separation and recycle, and wherein ether product is recovered as a component of an organic phase, also formed during the neutralization, for isolation or further reaction, as desired. Still further in accordance with the invention, a process as above described is provided wherein water of etherification is fractionated from the ether-forming reaction mixture during the etherification to cause a shift of the etherification equilibrium to the ether side with concomitantly increased per-pass conversion. Still further, an etherification process as above described is provided wherein, following etherification, the acid component of the etherification reaction mixture is neutralized followed by cooling the neutralized mixture to provide ether crystals as product and residual mother liquor for recycle to the etherification.

Any primary or secondary alcohol can be utilized as the alcohol reactant in the practice of the invention. However, those more generally utilized, and preferred, contain not more than about 30 carbon atoms. Exemplary of alcohol reactants utilized in the practice of the invention are n-propyl alcohol, i-butyl alcohol, n-decyl alcohol, lauryl alcohol, tridecyl alcohol, stearyl alcohol, n-octacosanol, ceryl alcohol, cinnamic alcohol, tetrahydrofurfuryl alcohol, furfuryl alcohol, ethylene glycol, glycerol, pentaerythritol, p-octylbenzyl alcohol, p-methylbenzyl alcohol, p-chlorobenzyl alcohol, propargyl alcohol, isopropylpropargyl alcohol, 2-phenyl ethanol, p-hexoxybenzyl alcohol, p-methoxybenzyl alcohol, p-nitrobenzyl alcohol and hexamethylene glycol. Further exemplary are those alcohol reactants tabulated hereinafter. Alcohol reactants presently preferred in the practice of the invention are those characterized by the structural formula

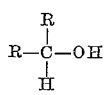

wherein each R is a radical selected from the group consisting of hydrogen, alkyl, alkenyl, alkinyl, phenyl, alkylphenyl, phenylalkyl, alkoxyphenyl, phenylalkenyl, alkoxy alkyl, hydroxy alkyl, cycloaliphatic, halophenyl, nitrophenyl, furyl and tetrahydrofuryl, but the said alcohol containing not more than 30 carbon atoms.

The p-nitrosophenol-alcohol reaction is preferably conducted at a temperature in the range of from about 15 to 70° C. Reaction time is generally at least about 2 minutes and up to about 500 minutes, and under the preferred temperature conditions is generally within the range of from 10 to 200 minutes often from 15 to 150 minutes. Although etherification generally takes place under temperature and time conditions outside the above referred to ranges, product yield under such conditions is generally lower than that economically feasible for commercial operation, due to undesirable side reactions at the higher temperature levels and due to unduly low reaction rates at the lower temperatures.

Selection of contact time is, of course, dependent upon the temperature employed. Inasmuch as higher temperatures favor increased rate of the etherification reaction and inasmuch as various alcohol reactants are utilized in the practice of the invention, it is important to correlate the time and temperature conditions within the above ranges to provide optimum yield.

Pressure conditions for the etherication are not critical except that sufficient pressure is necessary for retaining the reactants in liquid phase. Thus, pressures at least equal to the vapor pressure of the system are employed.

Any acid can be utilized as catalyst in carrying out the etherification, although stronger acids are preferred because they provide for higher reaction rate. Unless an acid catalyst is employed, no reaction occurs, the rate of reaction being dependent upon the amount of catalyst in the system, i.e., higher reaction rates are obtained with increasing amount of catalyst. The mole ratio of acid catalyst to p-nitrosophenol introduced into the etherication reaction is preferably not greater than about 1:1 and generally within the range of about 0.005:1 to 0.2:1. At a catalyst content above the said 1:1 mole ratio, undesirable side reactions often occur with concomitantly lowered yield of ether product. Usually with a given catalyst there is an optimum concentration which depends on the temperature and the particular ether being formed. For example, when employing sulfuric acid as catalyst, a concentration of about 2 mole percent (based on the p-nitrosophenol reactant) is advantageously utilized. Exemplary acid catalysts are sulfuric, hydrochloric, phosphoric, p-toluenesulfonic, hydrobromic, hydroiodic, iodic, perchloric, periodic, nitric, benzenesulfonic, methanesulfuric, orthophosphoric, pyrophosphoric, mono-, di-, and tri-, chloroacetic and maleic acids; phosphorus pentachloride, titanium tetrachloride, aluminum chloride, boron trifluoride, ferric chloride, acid clays, e.g., silica-alumina, super filtrol, and acid ion exchange resins such as a polymerized sulfonated vinyl benzene, and the like. Solid acid catalysts are particularly advantageously employed in the practice of the invention as beds, e.g., columnar or layered, in fixed catalyst bed type operation.

Although any acid catalyst can be employed in the practice of the invention, ether product yields are often somewhat lower when carboxylic acid catalysts are employed due to a tendency of the carboxylic acids to enter into undesirable side reactions in the etherification reaction mixture. Also some high oxygen acids such as nitric acid, perchloric acid, periodic acid and the like are less desirable among the inorganic acid catalysts, due to the oxidizing tendencies of these acids, in the etherification reaction mixture, with accompanying lowering of ether product yield.

The rate of reaction and the equilibrium concentrations are dependent upon the product of the concentration of the reactants. Accordingly, highest yield of ether under any given set of conditions is obtained when the alcohol reactant serves as the sole solvent for the etherification reaction mixture and the p-nitrosophenol is maintained in the alcohol-reactant solvent at the saturation level, as in slurry form, in which event the range of p-nitrosophenol concentration is generally in the order of from 0.2 to 3.5 molar, more preferably from 1 to 3 molar.

The invention, in numerous embodiments, contains unique processing advantages due to azeotrope formation involving the alcohol reactant and water of etherification and due also to the use of supplemental solvents, at various points in the process system, all as described more fully hereinafter.

The etherification per se can advantageously be carried out utilizing the liquid alcohol reactant as the sole reaction mixture solvent for reasons above discussed. However, any suitable solvent, chemically inert under the etherification conditions of the invention, can be utilized in the etherification when reacting alcohols which are solid under the etherification conditions, and to supplement the solvent action of a liquid alcohol reactant, and can be advantageously employed in various other of the process steps.

The supplemental solvent employed is preferably one in which solubility of unreacted p-nitrosophenol is only slight, or substantially nil, in order to facilitate separation of the unreacted p-nitrosophenol for further reaction. As described more fully hereinafter, hydrocarbon solvents are advantageously employed as such supplemental solvents and are when desired, conveniently exchanged, down stream from the etherification, for alcohol reactant to facilitate precipitation and removal of the p-nitrosophenol for recycle while retaining ether product in solution.

The invention is further illustrated with reference to the following examples.

*Example 1*

One hundred twenty-three grams (1 mole) of p-nitrosophenol was charged together with 355 ml. of dry methyl alcohol and 145 ml. toluene to a two-liter reactor and then brought to a temperature of 45° C. in a nitrogen atmosphere. One ml. of concentrated surfuric acid (0.018 mole) was then added to the resulting p-nitrosophenol-alcohol-toluene reaction mixture. The reactant-catalyst mixture was maintained, under nitrogen, at the above said temperature for 52 minutes after which the acid catalyst was nuetralized by the addition of 1.5 molar aqueous sodium hydroxide followed by addition of 500 ml. of toluene to the neutralized mixture.

Methanol and water were vacuum distilled from the resulting neutralized solution, each as a toluene azeotrope, the toluene-methanol azeotrope being the lower boiling and thus, the first removed.

By the resulting solvent exchange, namely, toluene for unreacted alcohol, the unreacted p-nitrosophenol precipitated due to its low solubility in toluene. The precipitated p-nitrosophenol was removed from the toluene solution containing same, by filtration, with recovery of 638 ml. filtrate. The filter cake was dissolved in 300 ml. methanol, filtered to remove catalyst salt, and then returned to the reactor. Fifty-five ml. of methanol, 70 grams of p-nitrosophenol and 145 ml. toluene were then also added to the reactor together with 1 ml. concentrated sulfuric acid to start a second cycle. The process was carried through 4 cycles. A total of 2.7 moles of p-nitrosophenol was used. In the fourth cycle, the catalyst concentration was doubled.

The filtrates in each cycle, i.e., toluene solution of the ether product, were combined and stripped of toluene under vacuum and the resulting solution was dissolved in two volumes of n-pentane and chilled to —40° C. to effect crystallization of p-nitrosophenyl methyl ether product. One hundred ninety-two grams of dry, p-nitrosophenyl methyl ether, of over 95 percent purity was recovered for an average conversion in each cycle of 55% and a yield of 88%.

Example 2

One hundred twenty-three grams (0.9 mole) of p-nitrosophenol of 90 percent purity was charged to a two-liter nitrogen-flushed reactor together with 500 ml. of anhydrous ethanol and 4.75 grams (0.025 mole) p-toluenesulfonic acid hydrate in 50 ml. ethanol, and the system was brought to 45° C. and then held at that temperature, under nitrogen, for one hour. The catalyst in the reaction mixture was neutralized with alcoholic KOH and the volume of the resulting solution was then reduced to 200 ml. under vacuum. Five hundred ml. of n-heptane was then added and the system again stripped under vacuum to 300 ml. A 250 ml. charge of n-heptane was then added and the stripping operation repeated. In this manner, n-heptane was exchanged for ethanol as solvent for the reaction mixture and p-nitrosophenol, and the latter, exhibiting low solubility in the resulting n-heptane solvent, precipitated, and was removed by filtration. Three hundred sixty ml. of n-heptane solution of p-nitrosophenyl ethyl ether (filtrate) was recovered and subjected to crystallization at —40° C. to provide 54 grams of dry p-nitrosophenyl ethyl ether crystals of greater than 95 percent purity. The process conversion was 40 percent.

Example 3

The procedure of Example 2 was repeated except that the p-nitrosophenyl alkyl ether product was isolated by pouring the equilibrated mixture of ethanol, catalyst, p-nitrosophenol, and p-nitrosophenyl ethyl ether into 10 volumes of $H_2O$ containing approximately 0.5 mole of NaOH. This was extracted twice with one volume of n-pentane. The volume of the resulting solution of p-nitrosophenyl ethyl ether was reduced to 100 ml. under vacuum and this mixture set to crystallize. The crystals were separated, and dissolved in 50 ml. pentane and recrystallized. The twice recrystallized material was dried, and subjected to carbon-hydrogen-nitrogen analysis, the results of which with comparison to the empirical molecular formula of p-nitrosophenyl alkyl ether, are set forth in the following tabulation:

| Percent | Calculated for $C_8H_9NO_2$ | Found |
|---|---|---|
| Carbon | 63.6 | 63.7 |
| Hydrogen | 6.00 | 6.04 |
| Nitrogen | 9.28 | 9.32 |
| Molecular weight | 151.2 | 152 |

The following alcohols were reacted with p-nitrosophenol in the presence of an acid catalyst at a temperature in the order of about 25° C. to form the corresponding p-nitrosophenyl ether, which in the order of the alcohols listed were respectively: p-nitrosophenyl methyl ether, p-nitrosophenyl ethyl ether, p-nitrosophenyl n-butyl ether, p-nitrosophenyl cetyl ether, p-nitrosophenyl benzyl ether, ethylene glycol mono-p-nitrosophenyl ether, p-nitrosophenyl allyl ether, p-nitrosophenyl oleyl ether, p-nitrosophenyl isopropyl ether, p-nitrosophenyl sec.-amyl ether, p-nitrosophenyl 2-octyl ether and p-nitrosophenyl cyclohexyl ether. The results are tabulated as follows:

| Alcohol Reactant | Mole Ratio, Alcohol/p-Nitrosophenol, initially added | Acid catalyst (p-toluenesulfonic acid), mole ratio, acid/p-nitrosophenol | Conversion based on the Nitrosophenol Reactant[2] |
|---|---|---|---|
| Methanol | 21 | 0.02 | 55 |
| Ethanol | 15 | 0.025 | 50 |
| n-Butanol | 9 | 0.02 | 45 |
| Cetyl alcohol | 2 | 0.16 | 13 |
| Benzyl alcohol | 8 | 0.16 | 20 |
| Cellosolve [1] | 9 | 0.16 | 20 |
| Allyl alcohol | 13 | 0.16 | 20 |
| Oleyl alcohol | 3 | 0.16 | 11 |
| Isopropyl alcohol | 11 | .04 | 10 |
| Sec. amyl alcohol | 8 | 0.16 | 8–10 |
| 2-Octyl alcohol | 5 | 0.16 | 8–10 |
| Cyclohexyl alcohol | 8 | 0.16 | 8–10 |

[1] Monoethyl ether of ethylene glycol.
[2] Determination based on ultraviolet spectrum.

Figure 2:
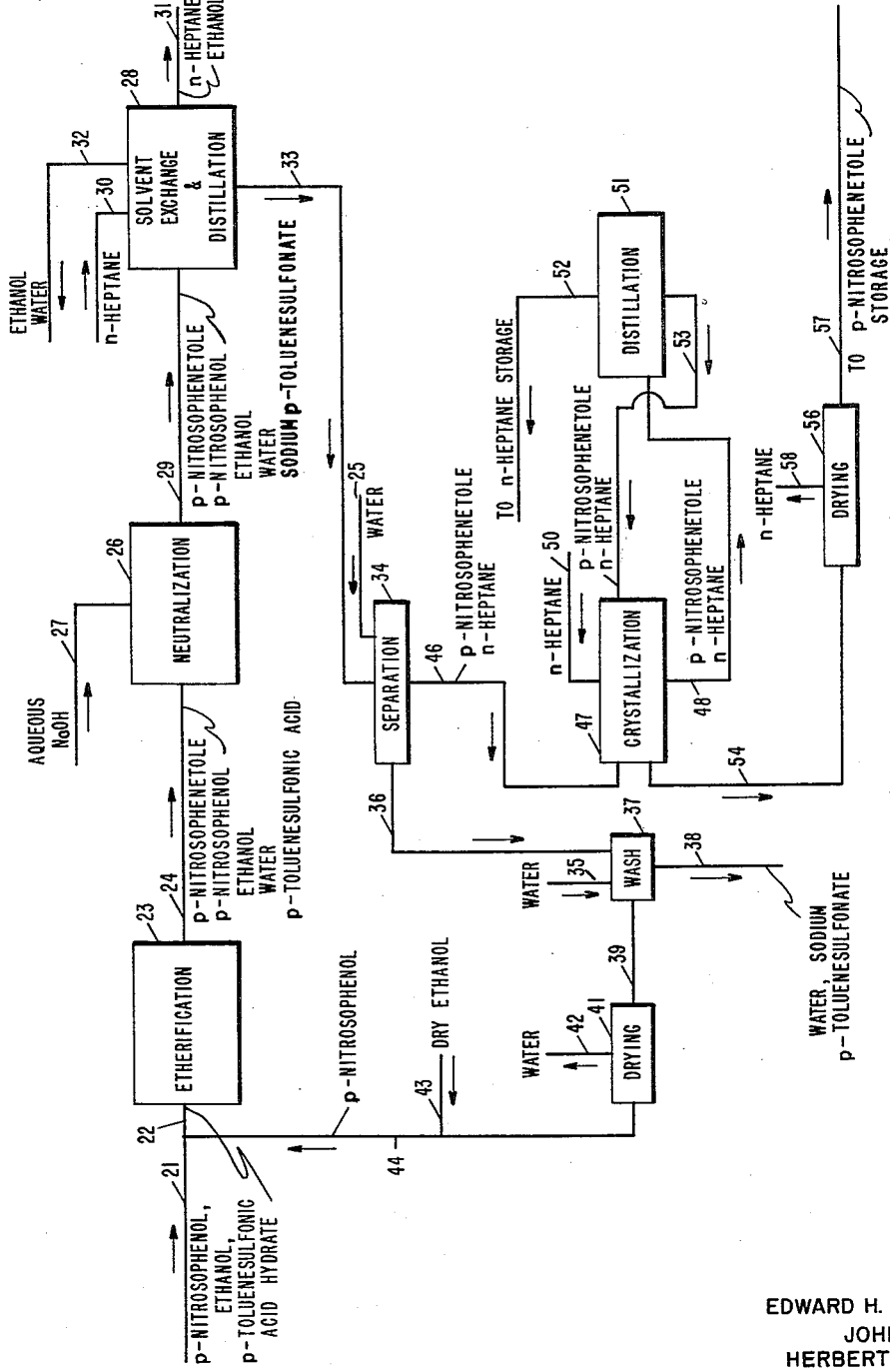
Figure 3:
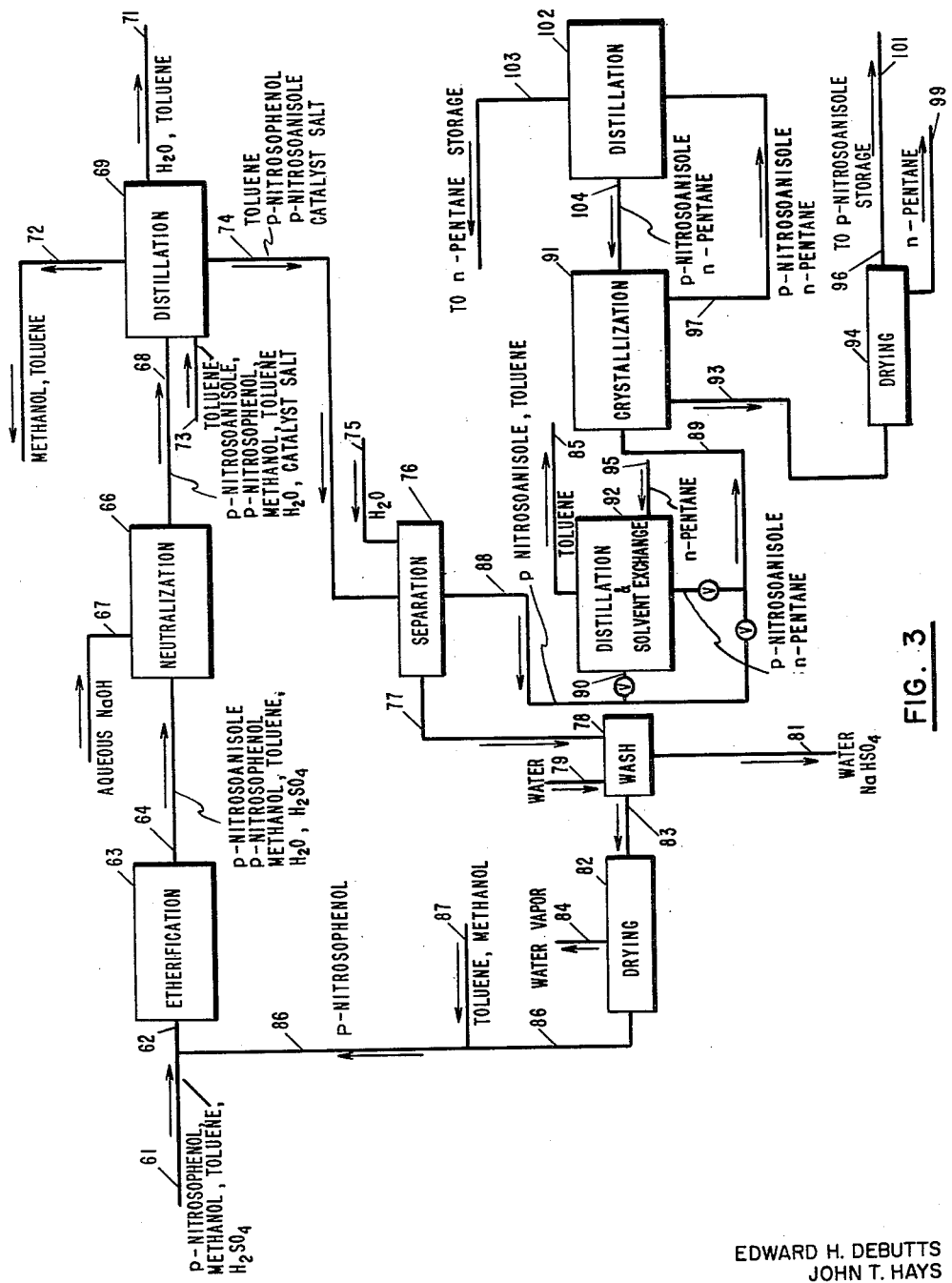
Figures 4, 5:
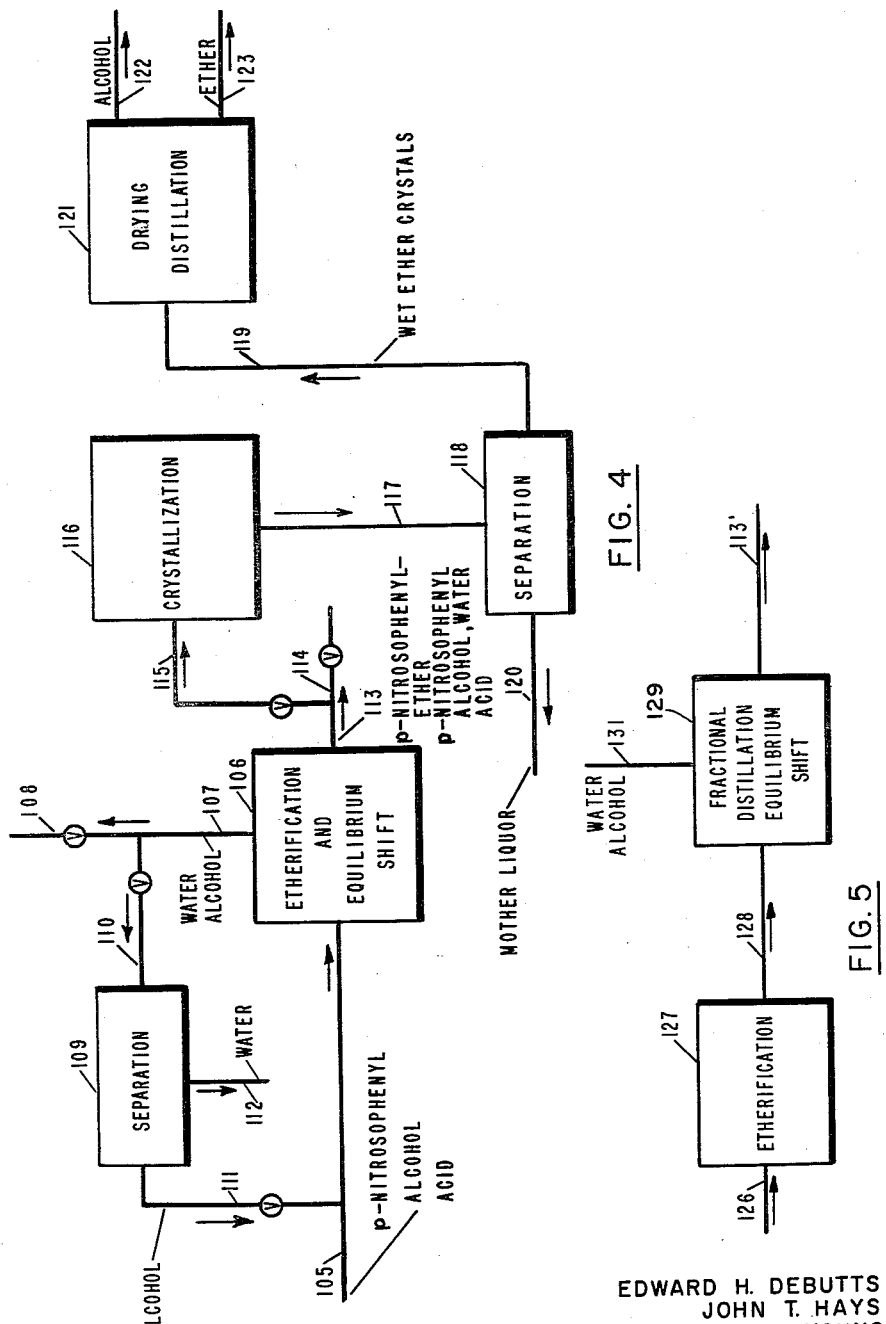
Figure 6:
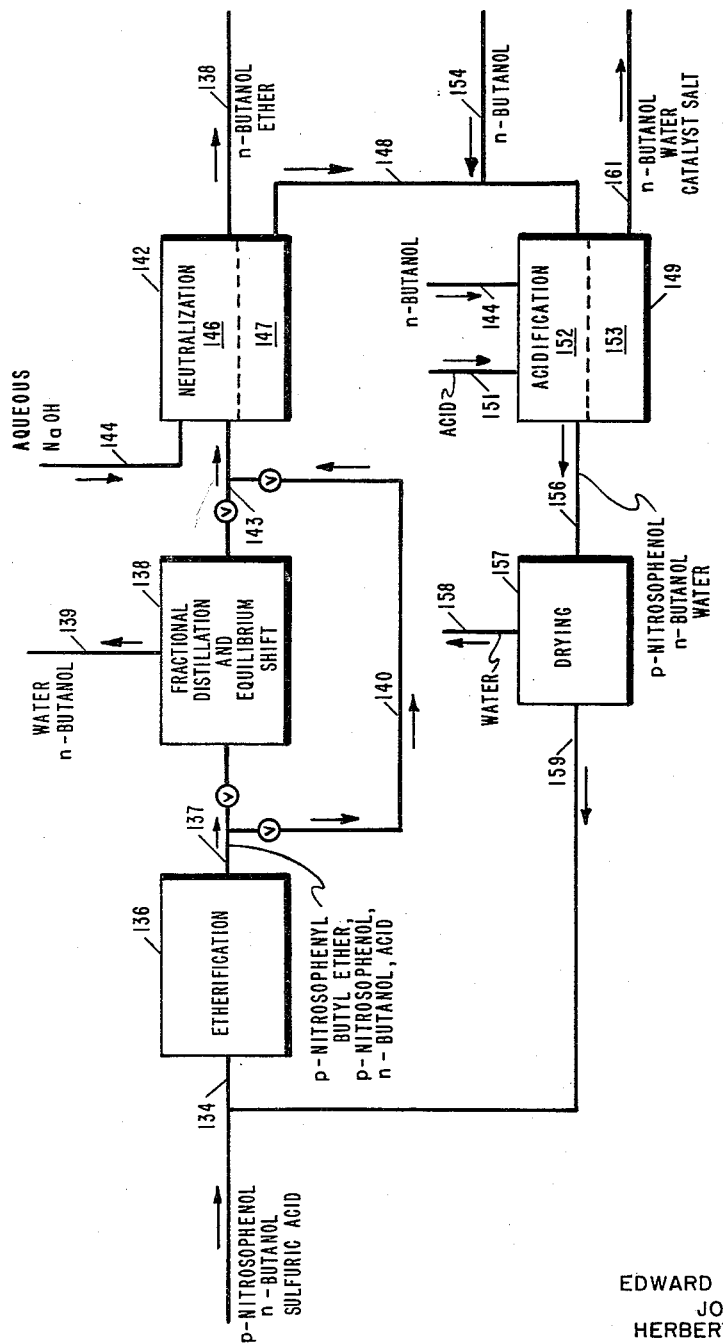

Process of the invention is illustrated with reference to the diagrammatical flow sheets of FIGURES 1–6 of the attached drawings of which FIGURE 1 is illustrative of the basic etherification concept of the invention; FIGURES 2 and 3 are illustrative of process embodiments wherein the alcohol reactant is employed as both reactant and solvent with subsequent solvent exchange (FIG. 2) and wherein a supplemental solvent is initially employed for the etherification, with or without a subsequent solvent exchange, as desired (FIG. 3); FIGURE 4 is illustrative of the fractional distillation of water of etherification from the ether-forming reaction mixture during the etherification to cause shift of the equilibrium toward the ether side with concomitant increase in per-pass conversion, all in the same zone; FIGURE 5 is the same as FIGURE 4 except that the etherification is initially carried out in one zone, and completed in another zone concurrently with removal of water of etherification therefrom; and FIGURE 6 is illustrative of an embodiment utilizing a water-immiscible alcohol reactant, n-butanol for purpose of illustration, in combination with the equilibrium shift concept of FIGURES 4 and 5. The embodiments of the drawings also illustrate use of both of both inorganic and organic acids for the etherification.

Referring to FIGURE 1, p-nitrosophenol together with a primary or secondary alcohol, and acid catalyst for etherification of the nitrosophenol with the alcohol to produce a corresponding p-nitrosophenyl ether, are introduced into etherification zone 1 preferably as an alcohol-p-nitrosophenol mixture via line 2 and acid catalyst via line 3. Etherification zone 1 is generally maintained at any suitable temperature in the above described 0–150° C. range, more often in the range of about 15 to 70° C., and the reactants and catalyst are maintained therein for a sufficient time for etherification to take place, which is generally in the order of the above described range of 2–500 minutes, more often about 10–200 minutes. The hole ratio of alcohol to p-nitrosophenol charged to etherification zone 1 is generally in the range of about 1:1 to 100:1, and the mole ratio of acid to p-nitrosophenol being, as hereinabove described, up to about 1:1. However, the proportions of reactants charged to zone 1 through lines 2 and 3 are preferably in the order of from 10 to 30 percent p-nitrosophenol, from 70 to 90 percent alcohol and from about 0.25 to 10 percent acid, all on a mole basis.

The resulting reaction mixture in etherification zone 1 can be processed in any suitable manner for recovery of p-nitrosophenyl ether product. In accordance with one embodiment it can be passed as total effluent to a separate zone for neutralization of the catalyst and recovery of product, or if desired, it can be subjected batchwise within zone 1 to neutralization and distillation steps required for recovery of ether product. Thus, effluent from zone 1 can be passed to neutralization and product recovery zone 4 via line 6 and admixed in zone 4 with a neutralizing agent such as a dilute aqueous alkali metal hydroxide from line 7 for neutralization of the acid catalyst. Neutralized product in zone 4 is then subjected to suitable steps for recovery of ether product. Zone 4 can comprise a multistep product separation system including distillation to remove water and alcohol components from the reaction mixture neutralized as described, separation of unreacted p-nitrosophenol, and separation of ether product from the residual reaction mixture such as by chilling at temperatures in the order of −40° C. Accordingly, unreacted alcohol and water can be withdrawn from zone 4 via line 8, unreacted p-nitrosophenol can be withdrawn via line 8a, neutralization product (aqueous catalyst salt) can be withdrawn via line 8b and p-nitrosophenyl ether product can be withdrawn via line 8c for storage or further utilization such as described hereinafter.

Referring to FIGURE 2, dry p-nitrosophenol, dry ethanol and p-toluenesulfonic acid hydrate are added to etherification zone 23 preferably as a mixture via lines 21 and 22 in relative proportions above described with reference to charge to zone 1 from lines 2 and 3, of FIGURE 1. Addition of these materials as separate streams can be carried out, if desired, although in that event, some ethanol is necessary as solvent for p-nitrosophenol unless alternatively, the p-nitrosophenol is added in solid state.

Etherification zone 23 is maintained at any suitable temperature in the herein described range, preferably in the order of about 15 to 70° C., under which conditions the p-nitrosophenol is reacted with the ethanol to form p-nitrosophenyl ethyl ether. Reaction time in zone 23 is sufficient for substantially reaching equilibrium of the etherification and is generally from about 10 to 200 minutes.

Total effluent from etherification zone 23 is passed via line 24 to neutralization zone 26 together with an aqueous alkaline agent such as an alkali metal hydroxide, e.g., sodium hydroxide from line 27, suitable, and in substantially exact amount, for neutralizing only the acid component of the effluent from line 24, which effluent comprises p-nitrosophenetole (the ether) unreacted p-nitrosophenol, unreacted ethanol, water and p-toluenesulfonic acid. Neutralization in zone 26 is carried out at any suitable temperature, advantageously at about 20–30° C. and is controlled, as above described, to neutralize only the acid catalyst so as to retain p-nitrosophenol in its initial unreacted form for recycle as described hereinafter.

Effluent from zone 26 comprises the ether, unreacted reactants, water and catalyst salt, and is passed to solvent exchange and distillation zone 28 via line 29 wherein it is distilled under suitable vacuum conditions in the presence of a solvent which exhibits sufficiently low solvent action for p-nitrosophenol to cause precipitation of the p-nitrosophenol when it has replaced the alcohol-reactant solvent but which then exhibits sufficiently high solvent power for the ether product to retain the ether in solution. Exemplary of such solvents are hydrocarbons such as n-pentane, n-hexane, n-heptane, benzene, toluene and xylene; chlorinated hydrocarbons such as carbon tetrachloride, chloroform and methylene chloride; and esters such as ethylacetate and butylacetate. Such a solvent is preferably a liquid hydrocarbon, for example, n-heptane, and is introduced into zone 28 via line 30. Under the distillation conditions in zone 28, water, including water of etherification, and ethanol, are removed from the system, n-heptane is exchanged for ethanol and unreacted p-nitrosophenol is precipitated for separation and recycle. Thus, in zone 28 effluent from zone 26 is distilled under vacuum conditions for removal of ethanol and water as distillate via line 32 and for the removal of ethanol and n-heptane as a separate fraction via line 31. Sufficient n-heptane is admitted through line 30 to make up for that lost via line 31.

If desired, zone 28 can be operated batchwise in conjunction with a hold tank, the latter for receiving effluent from zone 26 with cyclic discharge of same to zone 28. In such operation the liquid effluent from zone 26 is first distilled in zone 28 to remove ethanol and water as an overhead distillate, such as via line 32. n-Heptane is periodically added as make-up to the system from line 30. Upon removal of all water via line 32, the distillation is continued to remove the remainder of the ethanol as a n-heptane-ethanol azeotrope via line 32. In such batch operation, line 31 is not necessarily utilized. As ethanol is removed from the system and n-heptane added, the solubility of unreacted p-nitrosophenol in the distillation mixture decreases until when substantially all ethanol is removed and replaced by n-heptane, substantially all unreacted p-nitrosophenol has precipitated and the resulting distillation bottoms comprises a slurry of unreacted p-nitrosophenol, and catalyst salt, in n-heptane solution of p-nitrosophenetole.

In either event, i.e., whether batch or continuous operation in zone 28, total effluent, a slurry, is passed from zone 28 via line 33 to separation zone 34 which can be any suitable means for separating solid p-nitrosophenol for recycle to etherification zone 23. Thus, zone 34 can comprise a centrifugal separator system wherein solid p-nitrosophenol is separated from residual liquid and discharged in any suitable manner, such as a slurry with water from line 25, via line 36 to a water washing zone 37 wherein catalyst salt is washed from the solid p-nitrosophenol and, together with water from line 35, is discharged via line 38. In the event filtration is employed as the separation means in zone 34, effluent from zone 28 can be discharged into a hold tank and fed batchwise to a filtration unit which is operated cyclically to collect solid unreacted p-nitrosophenol cake and to then discharge the cake, preferably as a slurry, with water from line 25, via line 36. Alternative operation of the filtration system can include two filtration units connected in parallel with line 33 and adapted to operate in cycles so that one functions to collect the precipitated p-nitrosophenol while the other functions to discharge p-nitrosophenol previously collected. The collected precipitate can be water washed subsequent to removal of the filtrate from the filtration unit, and the washings discarded.

Independently of the particular separating means employed in zone 34, wet p-nitrosophenol from line 39 is heat dried under vacuum in zone 41 as, for example, under a vacuum of from 10 to 60 mm./Hg at a temperature of 35 to 60° C. for a time sufficient to distill substantially all water from the solid p-nitrosophenol for discharge via line 42. Residual dry p-nitrosophenol is passed from zone 41 alone or in admixture with dry ethanol from line 43 and recycled to zone 23 via lines 44 and 22.

Residual liquid from the separation of p-nitrosophenol in zone 34 comprises a n-heptane solution of the ether product and is discharged via line 46 to crystallization zone 47 maintained at a temperature sufficiently low to chill the solution from line 46 to cause crystallization of p-nitrosophenetole, i.e., the ether, the chilling temperature generally being in the order of about −40° C. Chilling in zone 47 generally requires from about 100 to 500 minutes although, of course, the actual time required is a function of the concentration of the solution and the chilling temperature utilized. Alternatively, the solvent can be separated from the ether by conventional vacuum distillation. p-Nitrosophenetole crystals are discharged from zone 47 as a slurry in n-heptane from line 50, if desired, via line 54 to zone 56 from which residual solvent, n-heptane in this case, is discharged via line 58 to storage, or for recycle to line 30 for reintroduction into the system. The dry crystals from zone 56 are discharged via line 57 to storage.

The mother liquor from the crystallization in zone 47, which contains some uncrystallized p-nitrophenetole in n-heptane is discharged from zone 47 via line 48 to distillation zone 51, the latter maintained under vacuum distillation conditions to provide for a substantial portion of the n-heptane from line 49 as overhead distillation product via line 52 to n-heptane storage or recycle via line 30. Bottoms product from zone 51 comprises a low n-heptane content solution of ether which is recycled to zone 47 via line 53.

Referring to FIGURE 3, p-nitrosophenol together with methanol, toluene as a supplemental solvent, and an acid as an etherification catalyst, for example, sulfuric acid, are passed together to etherification zone 63 preferably as an admixture via lines 61 and 62 and are added to zone 63, in proportions described herein with reference to charge to zone 1 via lines 2 and 3, of FIGURE 1. Etherification conditions of temperature, pressure and time in zone 63 are the same as those described hereinabove with reference to zones 1 and 23 of FIGURES 1 and 2 for effecting acid catalyzed etherification, in this case, etherification of p-nitrosophenol to form p-nitrosoanisole.

Total effluent from zone 63 comprises the ether, unreacted p-nitrosophenol, unreacted methanol, toluene, water and acid catalyst and is discharged via line 64 to neutralization zone 66 for neutralization of the acid catalyst with suitable neutralizing agent preferably an aqueous alkali metal hydroxide such as sodium hydroxide from line 67. Neutralization conditions in zone 66 are the same as those carried out in zone 26 of FIGURE 2, it being important to add only sufficient alkaline agent to neutralize the acid. Effluent from zone 66 comprises p-nitrosoanisole, unreacted p-nitrosophenol, methanol, toluene, water and acid salt and is discharged via line 68 to distillation zone 69 which is a distillation to remove methanol and water from the system and replace the methanol with toluene, i.e., in solvent exchange, to cause precipitation of the unreacted p-nitrosophenol due to its low solubility in toluene, for separation and recycle to etherification zone 63. Distillation zone 69 is maintained under vacuum distillation conditions to provide for removal of water, including water of etherification, and methanol, as separate toluene azeotropes via lines 71 and 72, respectively. Thus, as methanol is distilled from the system and replaced by toluene from line 73, solubility of the p-nitrosophenol in the distillation mixture decreases and substantially complete precipitation occurs. Supplemental toluene is added via line 73 in amount to also provide make-up for that lost as a component of the two azeotrope overhead fractions.

If desired, effluent from line 68 can be fed to a hold tank for delivery of the liquid to zone 69 for batch type distillation therein. In that event, liquid in zone 69 is distilled first to remove a methanol-toluene azeotrope overhead via line 72 and is continued to remove water as a toluene-water azeotrope through line 72, line 71 being not required in the batch operation.

Bottoms from zone 69 comprises catalyst salt, and a slurry of unreacted p-nitrosophenol in the toluene-ether solution, and is discharged via line 74 to separation zone 76 which, as zone 34 of FIGURE 2, can be any suitable means for separating the solid p-nitrosophenol from the slurry. Thus, when utilizing a centrifugal separator in zone 76, solid p-nitrosophenol separated in zone 76 is discharged via line 77 to wash zone 78 in any suitable manner, such as a slurry with water from line 75, and washed therein with water from line 79 to remove catalyst salt, i.e., sodium sulfate salts via line 81, together with wash water. If zone 76 is a filtration system, the collected filter cake can be removed and transferred to zone 78 in the same manner as described with reference to FIGURE 2 in respect of removal of solid p-nitrosophenol from a filtration system in zone 34 to zone 37.

Wet p-nitrosophenol in zone 78 is then passed to drying zone 82 via line 83 and heat treated therein at a temperature and under vacuum for the separation of water as vapor via line 84.

Dried p-nitrosophenol is passed from zone 82 in admixture with toluene and/or methanol, as desired, from line 87, and the resulting admixture recycled to etherification zone 63 via line 86.

Residual liquid from zone 76 comprises a toluene solution of the ether product and can be passed via lines 88 and 89 directly to crystallization zone 91 for cooling and crystallization of the ether product for recovery of the ether as crystals. Similarly, as illustrated with reference to zones 47 and 51 of FIGURE 2 and streams associated therewith, residual solution of ether in toluene can be discharged from zone 91, if desired, for distillation to remove toluene and to provide for recycle of residual toluene-ether solution to the crystallization zone.

However, toluene is difficult to remove in its last traces from the crystals in zone 91 and it is, therefore, preferred to first pass the liquid in line 88 via line 90 to distillation zone 92 in which toluene is distilled as overhead distillate via line 85 to provide for its replacement by a suitable solvent which is more volatile than toluene and which can easily be removed from the crystals formed in zone 91 and dried in drying zone 94. A solvent, lower boiling than toluene, say an alkane such as n-pentane, is advantageously utilized for this purpose and is added to the bottoms product of zone 92 via line 95 as replacement for toluene distilled overhead. Although the bottom product from zone 92 contains some toluene, the mole fraction thereof in the solution in line 89 is so low that it presents no problem with respect to its removal from the crystals in zone 91. n-Pentane-p-nitrosoanisole solution is passed via line 89 to crystallization zone 91 and cooled therein under conditions for crystallizing the ether; a n-pentane slurry of crystals from zone 91 is discharged via line 93 to dryer 94 and treated therein to remove n-pentane via line 99 to storage, or recycle to zone 92, and to provide dry crystals of p-nitrosoanisole for discharge via line 101 to storage.

Mother liquor from zone 91 comprises n-pentane with a small amount of toluene, and some uncrystallized p-nitrosoanisole and is discharged via line 97 to distillation zone 102 wherein a major proportion of the n-pentane is distilled as overhead product via line 103 for passage to storage, or recycle to the system via line 95. Distillation bottoms from zone 102 is recycled to zone 91 via line 104.

Referring to FIGURE 4, a slurry of p-nitrosophenol, a primary or secondary alcohol and an acid all in relative proportions the same as those set forth hereinabove with reference to charge to zone 1 from lines 2 and 3 of FIGURE 1, is introduced via line 105 into etherification zone 106 which is maintained under etherification conditions the same as those described herein with reference to zone 1 of FIGURE 1 under which conditions etherification takes place to form the corresponding p-nitrosophenyl ether.

The maximum etherification reaction equilibrium that ordinarily takes place in zone 106 is in the order of 50–55 percent toward the ether side. However, by removal of water of etherification from the ether-forming reaction zone, during the ether-forming reaction, the equilibrium is shifted to the ether side with concomitantly increased per-pass conversion of p-nitrosophenol to ether. Accordingly, zone 106 is maintained under fractional vacuum distillation conditions, also suitable for the etherification, such that water of etherification is distilled therefrom during the ether-forming reaction as a component of a water-alcohol reactant overhead distillate, sometimes an alcohol-water azeotrope, discharged via line 107. Suitable fractional vacuum distillation conditions in zone 106 are, say, in the order of from about 20–50 mm./Hg at about 20–50° C.

Water-alcohol from line 107 can be passed via line 108 for utilization external to the process but is preferably passed to zone 109 via line 110, wherein the alcohol component is separated by any suitable separation means and discharged via line 111 for recycle to the etherification zone via line 105, and wherein water, thus separated, is discharged via line 112.

Residual effluent from zone 106 contains p-nitrosophenyl ether obtained at a per-pass conversion of p-nitrosophenol to the ether in excess of 55 percent, for example, about 60–65 percent, and is discharged via lines 113 and 114 to any suitable ether recovery system for the recovery of ether product. However, total effluent from line 113 is advantageously passed via line 115 to crystallization zone 116 and therein maintained under cooling conditions for the formation of p-nitrosophenyl ether crystals, as described with reference to crystallization of ether product in process of FIGURES 2 and 3.

Total effluent is passed from zone 116 via line 117 to zone 118 which comprises any suitable means for separating crystals from line 117 from their mother liquor, such as a filtration or centrifugation system. Alcohol-wet crystals from zone 118 are discharged via line 119 to drying distillation zone 121 and dried therein under conditions for separating alcohol for discharge via line 122 for recycle, if desired, via line 105, and ether, uncrystallized in zone 116, discharged via line 123, for recycle, if desired, to zone 116 via line 114. Mother liquor from zone 116 is discharged from zone 118 via line 120.

Referring to FIGURE 5, a slurry of p-nitrosophenol of composition the same as that in line 105 of FIGURE 4 is introduced via line 126 into etherification zone 127 and therein maintained under etherification conditions the same as those described herein with reference to zone 1 of FIGURE 1 whereby etherification of the p-nitrosophenol takes place to form the corresponding p-nitrosophenyl ether. As above described, the maximum per-pass conversion determined by the etherification equilibrium is in the order of 50–55 percent. However, total effluent is discharged from etherification zone 127 via line 128 to distillation and equilibrium shift zone 129 maintained under fractional vacuum distillation conditions for the separation of water of etherification with alcohol reactant, generally as an azeotrope, as distillate for discharge via line 131.

Distillation conditions in zone 129 also constitute suitable conditions for continuation of the etherification initiated in zone 129, so that the etherification is continued in zone 129 with shift of the etherification equilibrium to the ether side and concomitantly increased per-pass conversion of p-nitrosophenol to the ether. Exemplary of suitable conditions for distillation in zone 129 are those vacuum distillation conditions set forth hereinabove with reference to distillation in zone 106 of FIGURE 4.

Total effluent-containing ether product formed in high per-pass conversion is discharged from zone 129 via line 113' to any suitable means for recovery of ether product and separation and recovery of other product streams as illustrated elsewhere in the specification and drawings, as for example, the recovery steps associated with processing of effluent in line 113, FIGURE 4.

Etherification in a first zone followed by fractional distillation and accompanying additional etherification in a second zone as illustrated with reference to FIGURE 5 is advantageous inasmuch as the etherification can be carried out with substantially an equilibrium conversion of say, 50–55 percent at a sufficiently low temperature to permit very little side reaction and to permit relatively high temperatures in the second zone for the fractional distillation without the occurrence, overall, of an unduly large amount of side reaction.

With reference to FIGURE 6 is illustrated an embodiment of the etherification process of the invention utilizing as the alcohol reactant one which is immiscible with water, at least to a large degree, such as n-butanol, amyl alcohol and the like. Thus, with reference to FIGURE 6, a slurry of p-nitrosophenol, a water immiscible alcohol reactant, say n-butanol, and acid, is introduced via line 134 into etherification zone 136 and reacted therein under etherification conditions defined hereinabove with reference to zone 1 of FIGURE 1 to form the corresponding p-nitrosophenyl ether, p-nitrosophenyl butyl ether in this case. Total effluent is discharged from zone 136 via line 137 to fractional vacuum distillation and equilibrium shift zone 138 and comprises p-nitrosophenyl butyl ether, unreacted p-nitrosophenol and unreacted alcohol reactants, and acid catalyst. Zone 138 is maintained under conditions for fractionally distilling water of etherification from the etherification reaction mixture from line 137 and also for continuing the etherification, initiated in zone 136, concurrently with the fractional distillation. Water of etherification is discharged from zone 138 via line 139 as a component of a water-n-butanol azeotrope. By removal of water of etherification from the etherification reaction mixture in zone 138, the equilibrium has been shifted as described hereinabove to the ether side to provide for increased per-pass conversion.

Residual effluent from zone 138 is passed into neutralization zone 142 via line 143 together with aqueous alkaline agent, preferably an alkali metal hydroxide such as sodium hydroxide, from line 144 in an amount of the aqueous agent to neutralize the acid in the effluent from zone 138 and to convert the unreacted p-nitrosophenol therein to the corresponding nitrosophenolate. This causes formation, in zone 142, of an organic phase 146 and a heavier aqueous phase 147 due to the immiscibility of the residual n-butanol reactant in water. Organic phase 146 comprises p-nitrosophenyl butyl ether, n-butanol and some water and is discharged via line 138 as a n-butanol solution for further utilization such as in an amination in accordance with method disclosed and claimed in the copending application Serial No. 17,894, filed March 28, 1960, or directly to product recovery such as a crystallization or distillation step for isolation of the ether product, as desired.

Aqueous phase 147 is discharged from zone 142 via line 148 to acidification zone 149 together with an acid such as sulfuric acid via line 151. Acidification takes place in zone 149 to reconvert the phenolate from line 148 to p-nitrosophenol, and results in the formation of an organic layer 152 comprising n-butanol containing p-nitrosophenol dissolved therein and supplemented with n-butanol from line 154, and aqueous phase 153.

Organic phase 152, comprising an n-butanol solution of p-nitrosophenol, is discharged from zone 149 via line 156 to drying zone 157 maintained under distillation conditions for separating water and discharge of same via line 158 and residual dried n-butanol-p-nitrosophenol for discharge via line 159 and recycle to etherification zone 136 via line 134. Aqueous phase 153 comprises some n-butanol, water and catalyst salt and is discharged from zone 149 via line 161 for utilization external to the process or for processing for recycle of n-butanol to the etherification zone 136, as desired.

The embodiment of FIGURE 6 can be carried out without the fractional vacuum distillation step of zone 138 in which case the maximum conversion will be that of the unshifted etherification equilibrium and will be at a maximum in the order of about 50–55 percent. Operation of the embodiment of FIGURE 6 in that manner is carried out by passing effluent from zone 136 directly to zone 142 for neutralization via lines 137 and 140 and requires a neutralization step of sufficiently increased capacity to neutralize the relatively greater amount of unreacted p-nitrosophenol in the effluent from zone 136. On the other hand, maximum p-nitrosophenol conversion is in the order of 60–65 percent when operating the equilibrium shift of FIGURES 4-6, and although that reduces neutralization requirements, it does require a fractional vacuum distillation step. The choice of operating the embodiment of FIGURE 6 with or without the equilibrium shift of zone 138 will, accordingly, depend upon the process economics in any given case which in turn depends upon the conversion obtained in the equilibrium shift step.

As illustrated with reference to the embodiments of FIGURES 4 and 5, neutralization of the acid and unreacted p-nitrosophenol in the etherification effluent from lines 113 and 113', intermediate the etherification and crystallization zones, can be dispensed with when conversion of p-nitrosophenol to the ether is in the order of from 60-65 percent due to the correspondingly smaller proportion of unreacted p-nitrosophenol in the etherification effluent which, although it crystallizes with the ether product as a contaminant, can be separated therefrom to eliminate the neutralization step prior to crystallization. However, if desired, and if the alcohol reactant is water immiscible, the effluent from lines 113 and/or 113' as the case may be can be neutralized with an aqueous alkaline agent to convert the unreacted p-nitrosophenol therein to the corresponding phenolate followed by separation of an organic phase free from p-nitrosophenol and cooling the said organic phase to crystallize the ether product therefrom; and if the said alcohol reactant is completely water immiscible, the effluent from lines 113 and/or 113' as the case may be can be first subjected to a solvent exchange step as illustrated with reference to FIGURES 2 and 3 followed by crystallization of ether crystals from the resulting solvent phase.

A sparging process in accordance with which water of etherification is removed from the etherification reaction mixture to shift the equilibrium to the ether side is disclosed and claimed in the copending application Ser. No. 17,893, filed March 28, 1960.

In the practice of that process, a sparge agent, preferably an alcohol the same as the etherification reactant alcohol, is passed through the etherification reaction mixture as a gas or vapor so that the sparge agent together with water of etherification is discharged as an overhead stream to shift the equilibrium reaction to the ether side, under which conditions a per-pass conversion of p-nitrosophenol to the ether as high as 95 percent and higher can be obtained.

As set forth in our above referred to copending application Serial No. 17,894, p-nitrosophenyl ethers can be reacted with selected primary phenyl and aliphatic amines to provide corresponding p-nitrosophenylamines which are in turn advantageously converted to corresponding diamine derivatives for various utilizations known in the art. Thus, although it would appear that direct amination of the p-nitrosophenol would be a satisfactory route to the phenylamine derivative, such reaction occurs, at best, in only slight yield. However, as discussed hereinabove, the diamine derivative can, nevertheless, be prepared from the p-nitrosophenol if the p-nitrosophenol is first converted to the corresponding p-nitrosophenyl ether with direct amination of the latter. Further, the ether as a component of the etherification reaction mixture formed in the practice of this invention, i.e., without isolation from the reaction mixture, can be directly aminated to form the p-nitrosophenylamine. This invention, therefore, provides not only for the etherification of p-nitrosophenol and a combination of process steps therefor, but also provides an etherification reaction mixture of which the ether component can be directly aminated to form a corresponding phenylamine derivative. Thus, irrespective of whether the ether reactant is first isolated from the etherification reaction mixture, the invention provides a route to phenylenediamine derivatives from p-nitrosophenol as a starting material.

It is especially advantageous to use p-nitrosophenol as a starting material via the route of p-nitrosophenyl ether formation of this invention for preparation of phenylenediamines, since this route is based on phenol which is a low cost, readily available material. Alternative routes involve use of N-substituted anilines such as diphenylamine or N-alkyl anilines which are generally much higher in cost than phenol. Such substituted anilines must be subjected to nitrosation to form a nitroso compound which can be subsequently rearranged to the p-nitrosoaniline derivative and reduced to the p-phenylenediamine. Another alternative involves coupling of a diazotized aromatic amine at the para position of an N-substituted aniline and reduction to give a mixture of the p-phenylenediamine derivative and the aromatic amine. The p-nitrosophenol route is obviously more readily adapted to low cost, commercial scale manufacture of phenylenediamine derivative.

By way of further illustration of the invention, 3.69 grams of p-nitrosophenol was stirred, together with 46 ml. of n-butanol and 1 ml. of 3 molar $H_2SO_4$ in n-butanol, in a 125 ml. reactor, under nitrogen for 3 hours at about 25° C. 10 ml. of 2 N sodium hydroxide and 30 ml. of water was then added to the resulting reaction mixture, with the formation of separate organic and aqueous layers, the latter containing unreacted p-nitrosophenol as p-nitroso n-butyl phenolate and acid salt, and the former comprising n-butanol and p-nitrosophenyl n-butyl ether dissolved therein. The layers were separated and analyzed by ultraviolet spectroscopy, the organic layer containing 2.5 grams of p-nitrosophenyl butyl ether, and the aqueous layer containing the p-nitrosophenolate in amount equivalent to 1.85 grams p-nitrosophenol. The per pass conversion of p-nitrosophenol to p-nitroso n-butyl ether was 47 percent.

As will be evident to those skilled in the art, various modifications can be made or followed, in the light of the foregoing disclosure and discussion, without departing from the spirit or scope of the disclosure or from the scope of the claims.

What we claim and desire to protect by Letters Patent is:

1. A process which comprises reacting p-nitrosophenol with an alcohol to form a p-nitrosophenyl ether in the presence of an acid as a catalyst therefor, by admixing said p-nitrosophenol with said alcohol and said acid in a mole ratio of said alcohol to said p-nitrosophenol within the range of from 1:1 to 100:1 and in a mole ratio of said acid to said p-nitrosophenol within the range of from 0.005:1 to 1:1; heating the resulting admixture at a temperature within the range of from 0-150° C. for a period of from 2-500 minutes, and recovering said p-nitrosophenyl ether as product of the process; and said alcohol being characterized by the structure formula

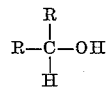

wherein each R is a radical selected from the group consisting of hydrogen, alkyl, alkenyl, alkinyl, phenyl, alkylphenyl, phenylalkyl, alkoxyphenyl, phenylalkenyl, alkoxyalkyl, hydroxyalkyl, cycloaliphatic, halophenyl, nitrophenyl, furyl and tetrahydrofuryl, but the said alcohol containing not more than 30 carbon atoms.

2. In a process of claim 1, fractionally vacuum distilling water of etherification from the resulting ether-forming reaction mixture during at least a portion of the ether-forming period, to thereby cause shift of the etherification equilibrium to the ether side with concomitant increase in per-pass conversion of said p-nitrosophenol to form said ether.

3. In a process of claim 1, said alcohol being water-miscible, neutralizing only the acid in the resulting ether-containing reaction mixture; then distilling unreacted alcohol reactant from said mixture, and during said distilling adding a solvent to the distillation bottoms in exchange for said alcohol distilled therefrom; the said solvent, after distillation of said alcohol as described, exhibiting sufficiently low solvent action for the p-nitrosophenol and sufficiently high solvent action for said ether product to cause precipitation of said p-nitrosophenol and to retain said ether in solution; and recovering ether product from said solvent.

4. In a process of claim 1, said alcohol being water immiscible, admixing aqueous alkaline agent with the resulting ether-containing reaction mixture in an amount sufficient to neutralize said acid and convert unreacted p-nitrosophenol therein to the corresponding phenolate, whereby the resulting neutralized admixture comprises an organic phase containing said ether product and an aqueous phase containing said phenolate; separating said aqueous phase and organic phases; acidifying said aqueous phase to convert said phenolate to p-nitrosophenol, whereby p-nitrosophenol precipitates from said aqueous phase; separating said precipitated p-nitrosophenol from said aqueous phase and drying same, and recycling resulting dried p-nitrosophenol to the etherification zone; and recovering ether product from said organic phase.

5. A process for the manufacture of a p-nitrosophenyl ether which comprises introducing a water-miscible alcohol selected from the group consisting of primary and secondary alcohols characterized by the structural formula

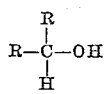

wherein each R is a radical selected from the group consisting of hydrogen, alkyl, alkenyl, alkinyl, phenyl, alkylphenyl, phenylalkyl, alkoxyphenyl, phenylalkenyl, alkoxyalkyl, hydroxyalkyl, cycloaliphatic, halophenyl, nitrophenyl, furyl and tetrahydrofuryl, but the said alcohol containing not more than 30 carbon atoms, together with p-nitrosophenol, in a mole ratio within the range of from 1:1 to 100:1 into admixture in an etherification zone together with an acid in a mole ratio to said p-nitrosophenol within the range of from 0.005:1 to 0.3:1 and maintaining the said resulting admixture at a temperature within the range of from 0–150° C. for a period of from 10–200 minutes, whereby etherification of said p-nitrosophenol takes place to form said p-nitrosophenyl ether; total effluent from the zone of said etherification containing said ether, unreacted p-nitrosophenol, unreacted alcohol, water of etherification and said acid, and passing said effluent from said etherification zone to a neutralization zone together with an aqueous alkaline agent in an amount just sufficient to neutralize said acid, and then neutralizing said acid therein; passing total effluent from said neutralization zone to a distillation zone together with a liquid hydrocarbon and therein distilling said water and said alcohol from said effluent together with sufficient amount of said hydrocarbon to substantially completely distill said water and said alcohol from said effluent, and introducing a hydrocarbon liquid into said distillation zone as make-up for hydrocarbon distilled as described, whereby said p-nitrosophenol in the bottoms product of said distillation precipitates and said p-nitrosophenyl ether is retained in solution with said hydrocarbon; passing substantially alcohol-free effluent from said distillation zone, as a slurry of p-nitrosophenol in said hydrocarbon, to a separation zone and therein separating the precipitated p-nitrosophenol; passing residual ether-containing solution from said separation zone to a cooling zone under cooling conditions therein to cause crystallization of ether product from said solution; passing solid p-nitrosophenol from said separation zone to a wash zone and therein passing water in washing contact with said p-nitrosophenol; passing resulting water washed p-nitrosophenol from said wash zone to a drying zone by distilling water from said p-nitrosophenol to dry same; passing resulting dried crystals from said drying zone in admixture with dry alcohol reactant to said etherification zone as part of the total p-nitrosophenol and alcohol introduced into said etherification zone, as described; and recovering crystalline p-nitrosophenyl ether as product.

6. In a process of claim 5 introducing a liquid hydrocarbon, the same as that introduced into said distillation zone, into said etherification zone as a supplemental solvent for the resulting etherification reaction mixture; passing residual liquid from said separation zone to a distillation zone and therein distilling same to remove at least a major portion of hydrocarbon therefrom as distillate; admixing a hydrocarbon, of volatility greater than that of the said hydrocarbon distilled, into admixture with bottoms product from the last said distillation and passing the resulting admixture of distillation bottoms and higher volatility hydrocarbon to said crystallization zone; passing hydrocarbon-wet crystals from said crystallization zone to a drying zone and therein distilling said hydrocarbon from said crystals; and recovering dry p-nitrosoanisole crystals as product of the process.

7. A process of claim 5 wherein the said alkaline agent is an alkali metal hydroxide.

8. A process of claim 5 wherein said water-miscible alcohol is selected from the group consisting of methanol and ethanol, and said temperature is in the range of from 15–70° C.

9. The process of claim 8 wherein said acid is selected from the group consisting of sulfuric acid and p-toluenesulfonic acid hydrate.

10. A process for the manufacture of p-nitrosophenyl butyl ether, which comprises admixing n-butanol with p-nitrosophenol in a mole ratio to said p-nitrosophenol within the range of from 1:1 to 100:1 and with an acid in a mole ratio to said p-nitrosophenol of from 0.005:1 to 0.3:1, and maintaining the said resulting admixture at a temperature within the range of from 15–70° C., whereby said p-nitrosophenol is etherified to form p-nitrosophenyl butyl ether; admixing an aqueous alkaline reacting agent with the resulting ether-containing mixture in an amount sufficient to neutralize acid therein and to react with unreacted p-nitrosophenol therein to convert same to the corresponding phenolate, whereby the total resulting neutralized ether-containing admixture comprises an organic phase containing said ether product and an aqueous phase containing said phenolate; separating said phases, and then acidifying the last said aqueous phase to convert said phenolate therein to p-nitrosophenol, whereby said p-nitrosophenol precipitates; separating precipitated p-nitrosophenol from said aqueous phase, drying same, and recycling resulting dried p-nitrosophenol to the zone of the said ether-forming reaction as part of the p-nitrosophenol admixed with n-butanol as described; and recovering p-nitrosophenyl butyl ether from said organic phase as product of the process.

11. A process of claim 10 wherein said alkaline agent is an alkali metal hydroxide.

12. The process of claim 10 wherein said acid is selected from the group consisting of sulfuric acid and p-toluenesulfonic acid hydrate.

References Cited in the file of this patent

Hantzsch et al.: Ber. Deut. Chem., vol. 39 (1906), pp. 1073–1084.

Roncari: Chemical Abstracts, vol. 26 (1932), 260–612, p. 2184.

(Copies in Library.)